J. G. CLEMENS.
SOLDERING APPARATUS.
APPLICATION FILED DEC. 18, 1915.
1,200,810.
Patented Oct. 10, 1916.
2 SHEETS—SHEET 1.
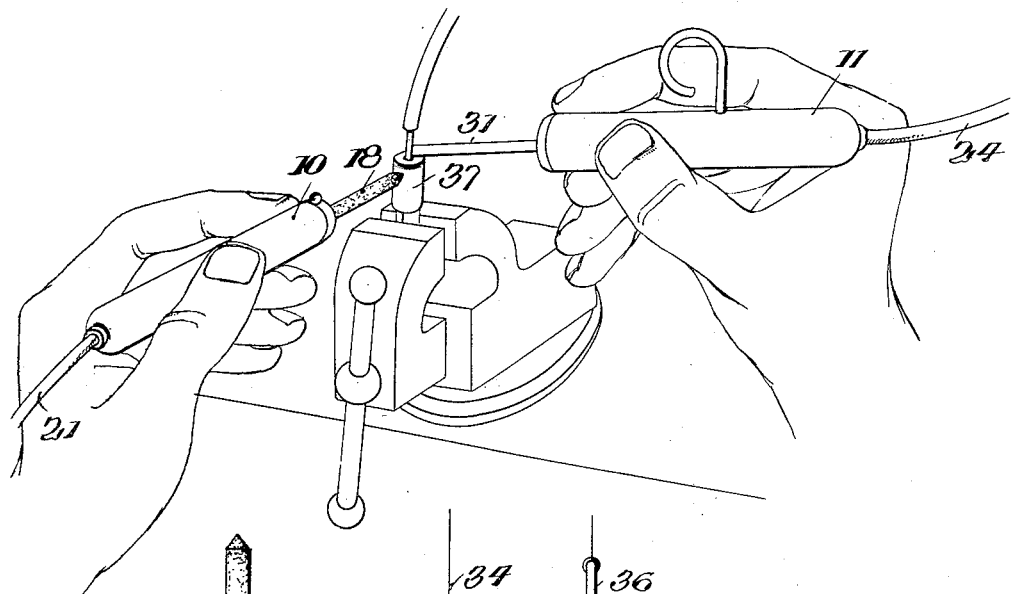
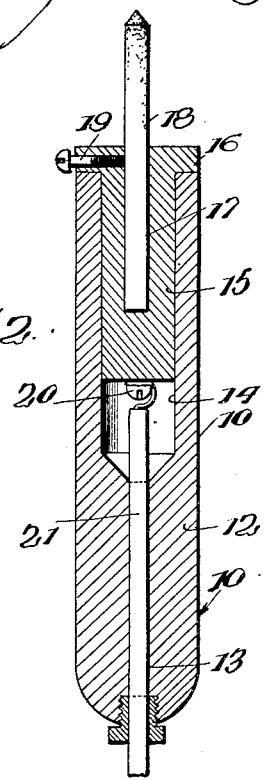
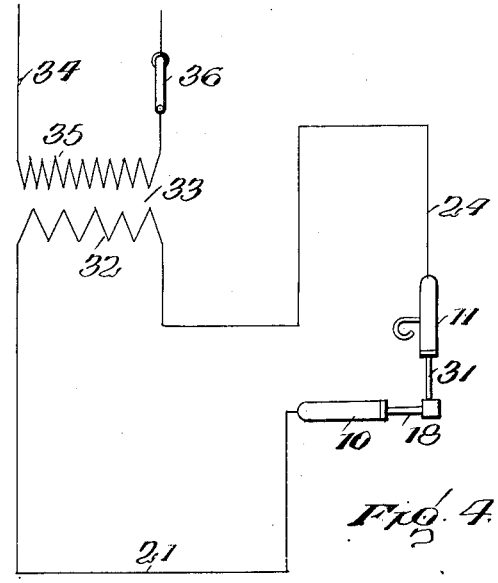
Inventor
J. G. Clemens
By
[signature], Attorneys

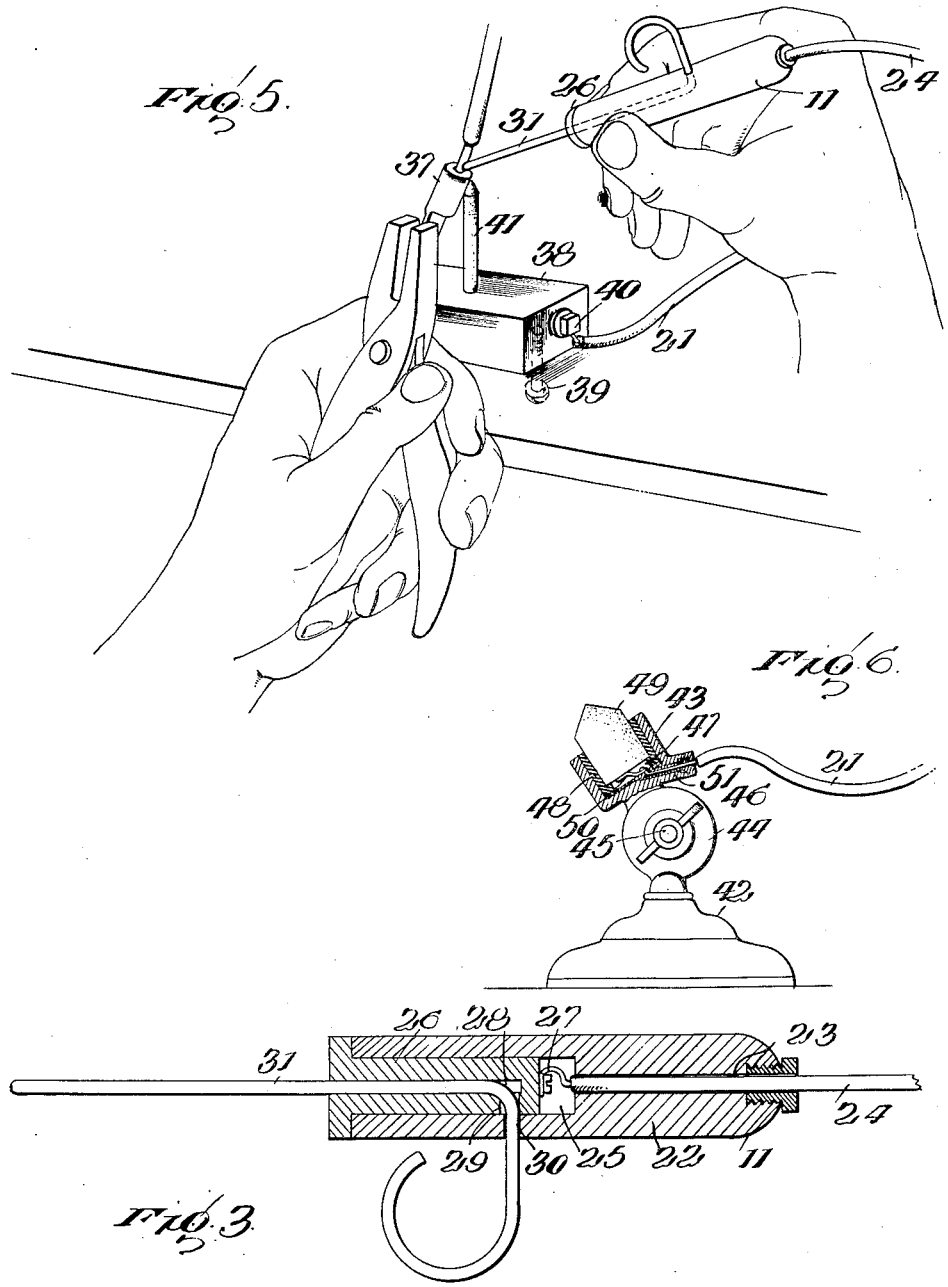

UNITED STATES PATENT OFFICE.

JOHN G. CLEMENS, OF BUFFALO, NEW YORK.

SOLDERING APPARATUS.

1,200,810.  Specification of Letters Patent.  Patented Oct. 10, 1916.

Application filed December 18, 1915. Serial No. 67,641.

*To all whom it may concern:*

Be it known that I, JOHN G. CLEMENS, a citizen of the United States, residing at Buffalo, in the county of Erie and State of New York, have invented certain new and useful Improvements in Soldering Apparatus, of which the following is a specification.

My present invention relates to new and useful improvements in methods of and apparatus for electrical soldering, the primary object of my invention being the provision of an improved method of soldering in which the current employed passes through the solder being used so that as soon as the solder is removed from the work being operated upon, the circuit will be broken and current thereby saved.

A further object of my invention consists in the provision of a soldering apparatus of such type that the heat electrically developed is developed directly at the part of the metals being soldered, thereby avoiding all waste of energy, due to loss of heat through conduction or radiation.

A further object of my invention consists in providing a soldering apparatus, the operation of which is not dependent upon the formation of an electric arc and in which the pieces of metal being joined form a portion of the heating circuit.

More specifically, my invention includes the provision of two co-acting holders or handles, one of which carries a piece of solder and the other a contact member of any suitable high resistance material, such as carbon, the solder and the contact being both included in a circuit normally open between the two and adapted to be closed by bringing the solder and contact into simultaneous engagement with the work being soldered.

In this connection, a still further object of my invention consists in the provision of a simple and effective means for securing the solder in its holder and the contact point in its holder.

With these and other objects in view, my invention will be more specifically described, illustrated in the accompanying drawings, and then pointed out in the claims which are attached to and form a part of this application.

In the drawings: Figure 1 is a perspective view of one form of soldering apparatus constructed in accordance with my invention, the apparatus being shown in use; Fig. 2 is a central longitudinal sectional view through the carbon holding handle; Fig. 3 is a corresponding view through the solder holding handle; Fig. 4 is a diagrammatic view of the wiring system employed with my soldering apparatus; Fig. 5 is a view corresponding to Fig. 1, illustrating a modified form of soldering apparatus; Fig. 6 is an elevation, partially in section, of a modified form of contact holder.

Corresponding and like parts are referred to in the following description and indicated in all the views of the drawings by the same reference characters.

As best shown in Fig. 1 of the drawings, my invention consists primarily in the two co-acting devices 10 and 11, one of which is a handle or holder supporting a contact point of high resistance material, while the other is a similar handle or holder supporting a piece of string solder.

Referring more particularly to Fig. 2 of the drawings, it will be seen that the device 10 includes a substantially cylindrical body portion 12 formed with a longitudinal bore 13 communicating at one end with a cylindrical socket or chamber 14 opening through the other end of the handle. This handle is formed of wood, porcelain or other suitable non-conductive material and its socket 14 receives the cylindrical body portion of a metallic bushing 15 terminating at its outer end in a stop shoulder 16 engaging the end of the handle 12. This bushing is formed with a longitudinal socket 17 to receive one end of a contact member 18 of any suitable high resistance material, such as carbon or carborundum. A set screw 19 is preferably threaded through the exposed end of the bushing to engage the carbon contact and hold it in place and the outer end of the carbon contact is preferably brought to a point as shown. A screw 20 or other suitable device is threaded into the inner end of the bushing 15 and forms a binding post to receive the bared end of an insulated conductor wire 21 which is passed into the handle through the bore 13.

Referring to Fig. 3 of the drawings, it will be seen that the device co-acting with the above contact holder is greatly similar in construction, including a cylindrical body 22 having the bore 23 to receive the conducting wire 24 and the socket 25 to receive the ferrule 26. The wire 24 is connected to the inner end of the ferrule by a screw 27 and the ferrule is provided with a socket 28 corresponding to the socket 17 of the ferrule 15 but formed at its inner end with a passage 29 opening through the side of the ferrule and alining with a passage 30 formed through the wall of the body or handle 22. When used, a piece of string solder 31 is passed through the ferrule and openings 29 and 30 and is therefore in circuit with the wire 24, as shown in the drawings. The wires 21 and 24 lead to the terminals of the secondary winding 32 of a transformer 33. When the apparatus is to be used, line wires 34 are connected to the terminals of the primary winding 35 of the transformer and a switch 36 is preferably interposed in one of these line wires. Any suitable source of current may be employed but, as a rule, I employ the ordinary electric lighting circuit. In any event, the transformer should be such as to step down the current supplied so that current passing to the apparatus shall not exceed 5 or 6 volts.

In use, assuming that the switch 36 is closed, the carbon contact and solder are simultaneously brought into engagement with the work to be soldered and the circuit from the transformer is, therefore, closed through the wires 21 and 24, the ferrules of the handles, the contact point of one handle, the work being soldered and the solder of the other handle. In Fig. 1, I have illustrated the employment of my soldering apparatus for soldering a terminal clip upon the end of a wire. The clip 37, with the wire applied, is supported in any suitable manner, the solder is brought to bear against those portions of the clip and wire to be joined and the carbon point is brought against the clip as near as possible to the parts to be joined. The flow of current through the circuit thus closed raises the carbon to a high temperature and the carbon in turn transmits its heat to the clip until the latter is heated sufficiently to melt the solder. Obviously, the removal of either the solder or the carbon contact from engagement with the metals being operated upon will break the circuit and there is, therefore, no loss of current.

Obviously, many changes in the construction of the holders or handles employed may be made without in any way departing from the spirit of my invention or changing the method of operation. For instance, in Fig. 5 I have illustrated a modified form of carbon contact holder which includes a supporting block 38 of carbon or other high resistance material which may be secured to a bench or table by screws 39. The wire 21 is connected to this block by a binding post 40 and the block, in its upper face, is formed with a cylindrical socket to seat the end of a carbon contact 41 corresponding to the carbon contact 18. With this form of my invention, it is obvious that the work being soldered is brought into proper engagement with the contact member 41 and the solder in the coöperating holder brought into engagement with the joint to be soldered. When the contact point in either form of my invention becomes injured or broken, it may be removed and replaced by another.

In Fig. 6 of the drawings, I have illustrated a still further form of carbon contact support including a base 42 and head 43 having mating ears 44 through which is passed a clamping screw 45 provided with a winged nut 46. This construction permits angular adjustment of the head 43 with respect to the base. The head 43 is formed with a socket 47 provided with a lining 48 of any suitable heat and current insulative material and receives the carbon contact 49. A spring 50 seats in the bottom of the socket and engages the carbon contact 49 and the wire 21 is led through an insulated bushing 51 and connected to this spring. This device is employed in the same manner as that shown in Fig. 5. It should be noted that the string solder employed will melt at a relatively low temperature, and its melting is not in any way caused by the passage of current through it but wholly by the heating of the metal against which the solder is positioned, due to passage of heat from the carbon contact to such metal.

Having thus described the invention, what is claimed as new is:

1. A soldering apparatus including a contact member of relatively high resistance material and a piece of solder both connected in a normally open circuit and adapted to be both brought independently into and out of engagement with the work to be soldered to control such circuit.

2. A soldering apparatus including co-acting handles, a piece of relatively high resistance material carried by one handle, a piece of solder carried by the other handle, and means for connecting current conducting wires to the high resistance material and solder to include such elements in a common circuit.

3. A soldering apparatus including handles of insulating material, metallic bushings in the handles, a piece of relatively high resistance material in electrical engagement with one bushing, a piece of string solder in electrical engagement with the other bushing, and means for supplying current to one bushing and conducting it from the other bushing.

4. A soldering apparatus including coacting handles provided with longitudinal bores communicating with sockets formed in the ends of the handles, metallic bushings located in the sockets, binding posts carried by the bushings, wires run through the bores of the handles and connected to the binding posts, a carbon contact point clamped in one bushing, and a piece of string solder threaded through a passage formed in the other bushing and handle.

In testimony whereof, I affix my signature.

JOHN G. CLEMENS. [L. S.]